United States Patent
Clarke

(10) Patent No.: US 7,631,467 B2
(45) Date of Patent: Dec. 15, 2009

(54) MAGNET RETENTION CLIP

(75) Inventor: Martin Henry David Clarke, Aurora (CA)

(73) Assignee: Illinois Tool Works Inc., Glenview, IL (US)

( * ) Notice: Subject to any disclaimer, the term of this patent is extended or adjusted under 35 U.S.C. 154(b) by 436 days.

(21) Appl. No.: 11/526,371

(22) Filed: Sep. 25, 2006

(65) Prior Publication Data

US 2007/0102606 A1    May 10, 2007

Related U.S. Application Data

(60) Provisional application No. 60/735,074, filed on Nov. 9, 2005.

(51) Int. Cl.
*E04B 9/00* (2006.01)

(52) U.S. Cl. .......................... 52/359; 52/358; 52/285.3; 52/285.4; 52/582.2; 40/468; 40/469; 40/666

(58) Field of Classification Search .................. 52/357, 52/358, 359, 282.5, 285.3, 582.2, 285.4; 292/359; 248/27.3; 40/469, 671, 663, 666, 40/468
See application file for complete search history.

(56) References Cited

U.S. PATENT DOCUMENTS

| | | | | | |
|---|---|---|---|---|---|
| 3,951,444 | A | * | 4/1976 | Shull | 292/359 |
| 4,919,369 | A | * | 4/1990 | Stehn | 248/27.3 |
| 5,038,535 | A | * | 8/1991 | Van Praag, III | 52/127.9 |
| 5,228,730 | A | * | 7/1993 | Gokcebay et al. | 292/144 |
| 6,607,303 | B2 | * | 8/2003 | Ngo et al. | 385/53 |
| 7,303,170 | B2 | * | 12/2007 | Fan et al. | 248/27.3 |

* cited by examiner

*Primary Examiner*—Richard E Chilcot, Jr.
*Assistant Examiner*—Chi Q Nguyen
(74) *Attorney, Agent, or Firm*—Mark W. Croll; Paul F. Donovan

(57) ABSTRACT

A magnet retention clip for assembling modular wall panels includes a magnet holder, prongs insertable into the wall panel and stabilizers outwardly of the magnet holder.

19 Claims, 3 Drawing Sheets

MAGNET RETENTION CLIP

CROSS-REFERENCE TO RELATED APPLICATIONS

The present regular United States Patent Application claims the benefits of U.S. Provisional Application Ser. No. 60/735,074, filed on Nov. 9, 2005.

FIELD OF THE INVENTION

The present invention relates generally to fastener devices or retention clips used for holding an item for attachment to a mating structure, and, more particularly, the invention pertains to a holding clip used for retaining a magnet and anchoring the magnet in a panel.

BACKGROUND OF THE INVENTION

Office furniture manufacturers provide various types of panel systems for use in office cubicles and other commercial or business environments. Individual panels are connected one to another to define separate work spaces. Work areas defined by panel systems are moved easily, allowing efficient office reconfiguration as changes are desired. Work areas can be defined, expanded and reconfigured without expensive remodeling or reconstruction by relocating the various panels, or by using more panels or fewer panels as required. Panel systems have achieved wide acceptance and use.

It is known to use various types of assembly constructions for the panels used in office environments. The panels can be secured in place in many different ways. Various materials with sound absorption and flame retardant properties have been used and are under consideration, as well as materials providing direct office utility such as for pinups and postings. One such material is a pressed fiberglass panel that is cut to a desired size and wrapped in fabric to provide an aesthetically pleasing surface. Due to the low structural strength of pressed fiberglass panels, various methods have been investigated for mounting the pressed fiberglass panels to various frame designs, some having achieved greater success than others. The fibrous, irregular fiber network of pressed fiberglass panels can present challenges in achieving the desired attachment. Physical fasteners can distort the layers of pressed fiberglass panels, reducing the integrity of the panel One solution has been to provide the wall panel with a metal frame and to hang the top portion of the pressed fiberglass panel from the frame, or to securely attach the panel to the frame to take up most of the weight of the panel. A magnet is attached to the fiberglass panels for connecting the bottom of the panel to the metal frame by magnetic attraction. The panels are then wrapped in fabric to provide the desired color, appearance or other cosmetic surface.

One known manner of securing a magnet to a fiberglass panel on the bottom portion of the panel assembly is through the use of adhesives. However, adhesives present some problems and difficulties. The magnets may not always be securely fastened, and the application of glue adds undesirable assembly costs. The use of glue is messy and labor intensive. The use of glue can delay final assembly, in that an appropriate cure time must be available before the panel is handled in a manner that could loosen the adhesive attachment. Accordingly, the panels can be only partly assembled, then held for the adhesive to cure.

SUMMARY OF THE INVENTION

The present invention provides a molded plastic part that has a cavity to accept and retain a magnet while being configured for anchoring in the fibrous panel.

In one aspect thereof, the present invention provides a magnet retention clip with a magnet holder defining a cavity configured for receiving and holding a magnet therein. The cavity has an exposure opening and an assembly opening. At least one deflectable retention arm at least partly obstructs the assembly opening. A probe extends from the magnet holder, and first and second stabilizers are at opposite sides of the magnet holder, substantially normal to the probe.

In another aspect thereof, the present invention provides a magnet and retention clip assembly with a magnet holder defining a cavity having an exposure opening in a face of the holder and an assembly opening for receiving a magnet. At least one deflectable retention arm at least partly obstructs the assembly opening. A probe extends outwardly from the magnet holder. First and second stabilizers at opposite sides of the magnet holder are substantially normal to the probe. A stepped magnet is disposed in the cavity and has a base and a projection from the base. The projection is narrower than the base, leaving an exposed surface of the base outwardly of the projection. The projection is exposed in the exposure opening.

In a still further aspect thereof, the present invention provides a wall panel assembly with a panel frame having at least a metal component, a panel of fibrous material and a magnet retention clip including a magnet holder defining a cavity having an exposure opening. A probe extends from the magnet holder and is embedded in the fibrous material. First and second stabilizers are at opposite sides of the magnet holder, substantially normal to the probe. The stabilizers are in contact with the fibrous material. A magnet is disposed in the cavity and has a portion exposed in the exposure opening. The magnet is assembled to the metal component.

An advantage of the present invention is providing a low cost component that secures a magnet and engages compressed fibrous panels, such as compressed fiberglass panels.

Another advantage of the present invention is providing an anchoring device that seats easily into a fiberglass panel.

Still another advantage of the present invention is providing a magnet clip for anchoring in fibrous panels that is easy to assemble both manually and robotically.

Other features and advantages of the invention will become apparent to those skilled in the art upon review of the following detailed description, claims and drawings in which like numerals are used to designate like features.

Figure 1:
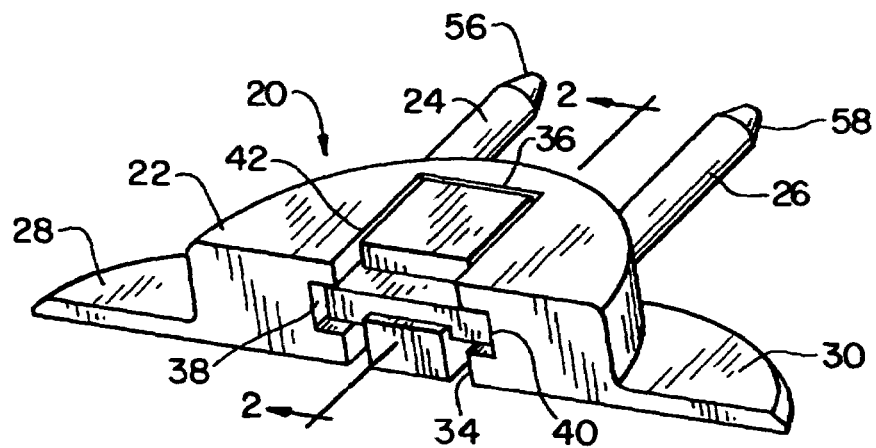
FIG. 1 is a perspective view of an assembled magnet and magnet retention clip in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 2:
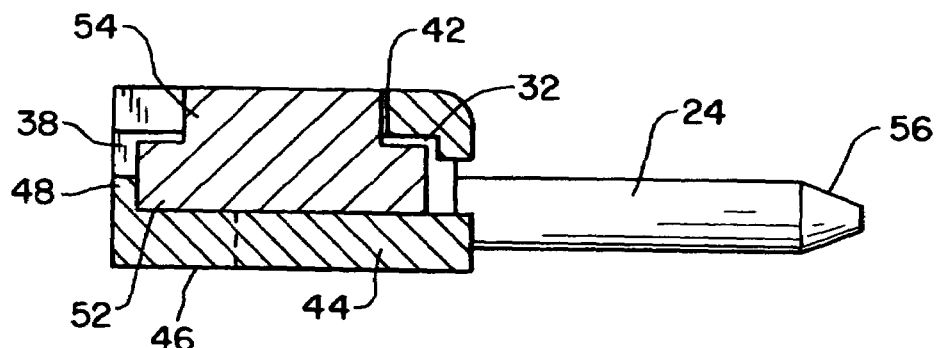
FIG. 2 is a cross-sectional view of the magnet retention clip shown in FIG. 1, the cross-section having been taken along line 2-2 of FIG. 1.
Figure 3:
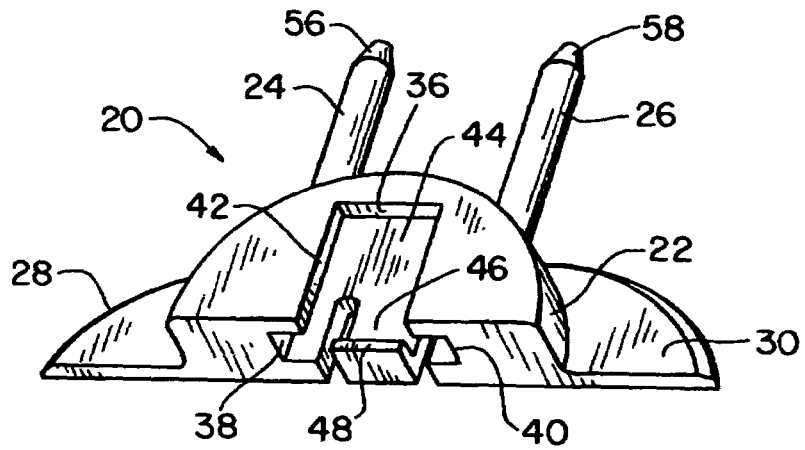
FIG. 3 is a perspective view of the magnet retention clip shown in FIG. 1, but without a magnet installed therein.

Referring now more specifically to the drawings and to FIGS. 1-3 in particular, a magnet retention clip 20 of the present invention is shown. Magnet retention clip 20 includes a magnet holder 22, probes 24 and 26, and stabilizers 28 and 30. Magnet retention clip 20, including magnet holder 22, probes 24, 26 and stabilizers 28, 30 can be a monolithic body of plastic, such as nylon, formed by injection molding or the like.

Magnet holder 22 forms a rectangular slot or cavity 32 having an assembly opening 34 and a closed end 36. Channels 38, 40 are formed along opposite sides of cavity 32, extending from assembly opening 34 to closed end 36. Accordingly, channels 38 and 40 are open at assembly opening 34 and closed at closed end 36. Assembly opening 34 provides assembly access to cavity 32 and channels 38, 40. Cavity 32 is open or exposed also at an exposure opening 42 in a face of holder 22. Cavity 32 has a bottom 44 opposite to exposure opening 42. A deflectable arm 46 is provided in bottom 44 and includes a lip 48 projecting above the surface of bottom 44 and into cavity 32, thereby obstructing assembly opening 34. Magnet holder 22 is configured to receive and retain a magnet 50 therein.

Figure 4:
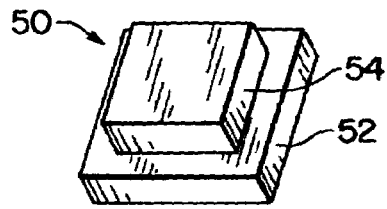
FIG. 4 is a perspective view of a magnet used in the magnetic retention clip shown in FIGS. 1-3.

Magnet 50 has a stepped configuration, with a larger base 52 and a smaller projection 54. The peripheral edge of base 52, as best seen in FIG. 4, extends outwardly beyond projection 54, and portions thereof on opposite sides of projection 54 are received in channels 38, 40 in the completed assembly. Projection 54 extends to and is exposed at exposure opening 42.

Probes 24, 26 are rod-shaped projections from magnet holder 22. Distal ends 56, 58 respectively thereof are tapered or pointed to facilitate insertion into a fiberglass mat, such as the aforementioned pressed fiberglass panels.

Stabilizers 28, 30 comprise outwardly projecting wings from magnet holder 22. Stabilizers 28, 30 inhibit rotation of the installed holder 20.

Magnet 50 is inserted into magnet holder 22 by deflecting arm 46 downwardly and sliding base 52 into channels 38, 40.

As base 52 passes beyond lip 48, arm 46 rebounds to its non-deflected position, and lip 48 overlies the outer end edge portion of base 52, to hold magnet 50 in cavity 32. The assembly of magnet retention clip 20 and magnet 50 can then be embedded in a compressed fiberglass panel 60 to secure the fiberglass panel 60 relative to a metal frame 62 for a wall panel assembly 64. As seen in the drawings, magnet holder 22 and stabilizers 28, 30 present a flat edge on a side of retention clip 20 opposite to probes 24, 26 for fitting against frame 62.

Figure 5:
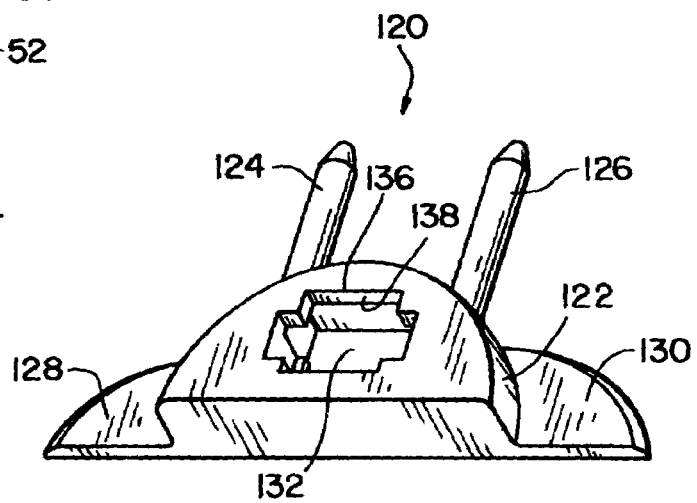
FIG. 5 is a perspective view of another embodiment for a magnet retention clip of the present invention.
Figure 6:
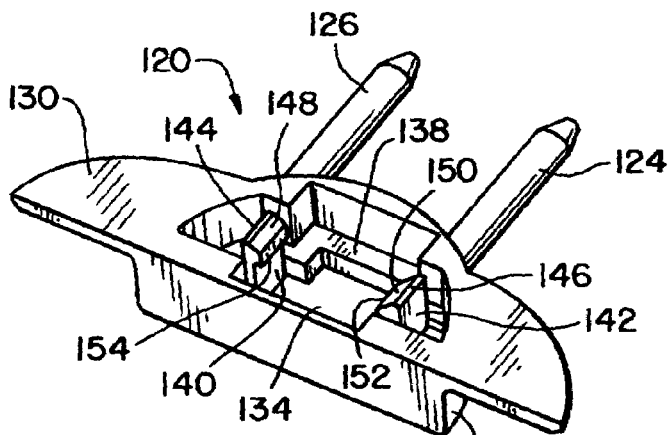
FIG. 6 is a perspective view of the clip shown in FIG. 5, but illustrating the side opposite the side shown in FIG. 5.

FIGS. 5 and 6 illustrate another embodiment of the present invention. A magnetic retention clip 120 includes a magnet holder 122, probes 124, 126 and stabilizers 128, 130. Again, clip 120 can be manufactured by injection molding of various plastics such as nylon, or formed in any other convenient and efficient manner. Probes 124, 126 are similar to probes 24 and 26 described previously, and stabilizers 128, 130 are similar to stabilizers 28, 30 described previously herein.

Holder 122 defines a rectangular cavity 132 having an assembly opening 134 at an assembly face of holder 122 and an exposure opening 136 at an exposure face of holder 122. At exposure opening 136 a flange 138 is formed in cavity 132 whereby exposure opening 136 is smaller than assembly opening 134. At assembly opening 134, deflectable retention arms 140, 142 are provided. Arms 140, 142 are outwardly deflectable to allow magnet 50 to be inserted therebetween. To facilitate the outward deflection, distal ends 144, 146 of arms 140, 142 are smoothly curved with inwardly directed faces 148, 150 thereof being angled to facilitate spreading as magnet 50 is forced therebetween. Inwardly directed 152 154 are provided at faces 148, 150

Magnet 50 is installed in retention clip 120 by inserting magnet 50 through assembly opening 134, leading with projection 54. Arms 140, 142 are deflected outwardly as magnet 50 engages angular distal end faces 148, 150 and is pushed there between. As base 52 of magnet 50 passes lips 152, 154, arms 140, 142 rebound inwardly. Lips 152, 154 overlap the then exposed bottom surface of base 52 and hold magnet 50 in cavity 132. Projection 54 of magnet 50 extends into exposure opening 42, with the peripheral edge portion of base 52 outwardly of projection 54 engaged against an inner surface of flange 138.

Figure 7:
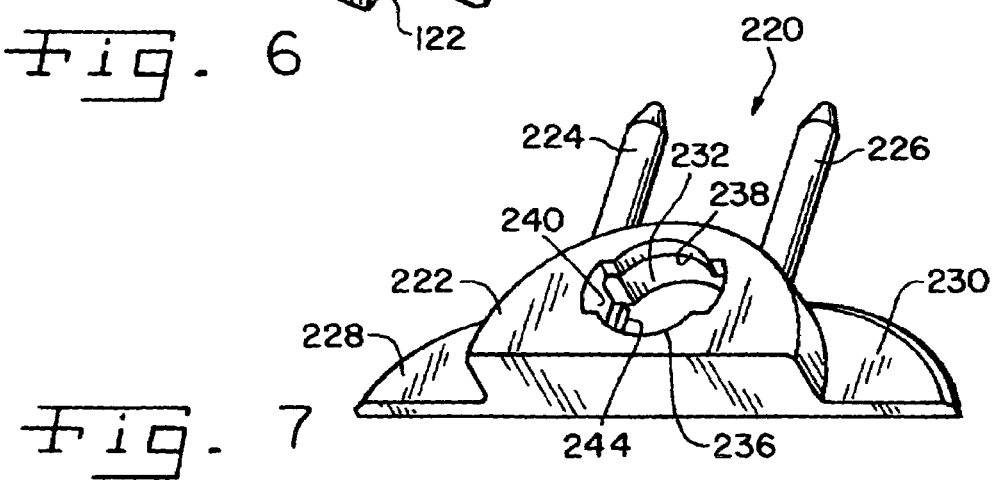
FIG. 7 is a perspective view of yet another embodiment for a magnet retention clip of the present invention.
Figures 8, 9:
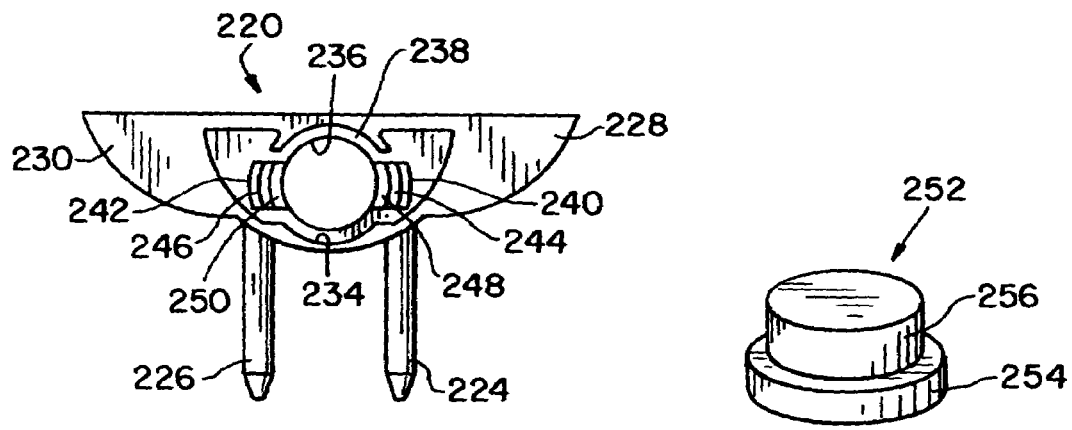
FIG. 8 is a plan view of the clip shown in FIG. 7, but illustrating the side opposite the side shown in FIG. 7.
FIG. 9 is a perspective view of a magnet for the retention clip shown in FIGS. 7 and 8.
Figure 10:
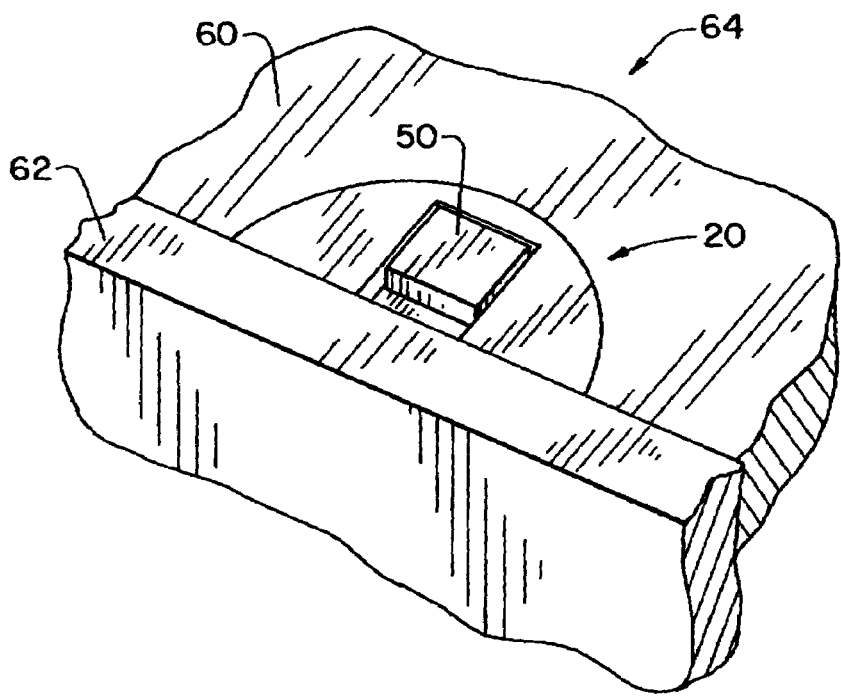
FIG. 10 is a fragmentary perspective view of a wall panel assembly having a magnetic retention clip in accordance with the present invention.

FIGS. 7, 8 and 9 illustrate yet another embodiment of the present invention that has advantages for both manual and robotic assembly. As with clips 20 and 120, a magnet retention clip 220 can be manufactured by injection molding of various plastics such as nylon, or formed in any other convenient and efficient manner. Magnet retention clip 220 includes a magnet holder 222, probes 224 and 226 and stabilizers 228 and 230. Probes 224, 226 are similar to probes 24, 26 and 124, 126 described previously herein. So also, stabilizers 228 and 230 are similar to stabilizers 28, 30 and 128, 130 described previously herein.

Magnet holder 222 is similar to magnet holder 122, defining a cavity 232 having an assembly opening 234 at an assembly face of holder 222 and an exposure opening 236 at an exposure face of holder 222. A flange 238 is formed in cavity 232 whereby exposure opening 236 is smaller than assembly opening 234. Magnet holder 222 differs from magnet holder 122 in that cavity 232 is round, whereas cavity 132 is rectangular. Arms 240, 242 similar to arms 140, 142 are provided at opposite sides of assembly opening 234 and are similarly shaped at distal ends 244, 246 having inwardly directed angular faces 248, 250 to facilitate deflection upon insertion of a suitable magnet 252.

A round magnet 252 is used for clip 220. Magnet 252 has a stepped configuration, with a larger base 254 and a smaller projection 256. The peripheral edge of base 254, as best seen in FIG. 9, extends outwardly beyond projection 256, and is received against the inner surface of flange 238 in the completed assembly. Projection 256 extends to and is exposed at first open face 234. Magnet 252 is inserted into cavity 232 by deflecting arms 240, 242 outwardly as magnet 252 is inserted into cavity 232 through assembly opening 234, and a manner similar to that described above for the insertion of magnet 50 into cavity 132 of magnet holder 122. However, the embodiment illustrated with respect to clip 220 facilitates assembly in that the insertion of magnet 252 having a round periphery into a round cavity 232 does not require the same orientation adjustment as does the insertion of magnet 50 having a rectangular periphery into a rectangular cavity 32 or 132. Accordingly, assembly manually and robotically is facilitated.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A magnet retention clip comprising:
   a magnet holder defining a cavity configured for receiving and holding a magnet therein, said cavity having an exposure opening and an assembly opening;
   at least one deflectable retention arm at least partly obstructing said assembly opening;
   two probes for embedding in a mat, said probes extending from said magnet holder; and
   first and second stabilizers at opposite sides of said magnet holder, substantially normal to said probes.

2. The clip of claim 1, said cavity having a closed end and an open end; and two channels disposed on opposite sides of said cavity.

3. The clip of claim 1, said magnet holder having an assembly face with said assembly opening therein and an exposure face having said exposure opening therein, said assembly opening and said exposure opening being disposed on opposite sides of said holder; and said cavity forming a flange whereby said assembly opening is larger than said exposure opening.

4. The clip of claim 3, said cavity being circular.

5. The clip of claim 3, said cavity being rectangular.

6. The clip of claim 3, said at least one deflectable arm comprising two deflectable arms on opposite sides of said cavity.

7. The clip of claim 6, said deflectable arms having distal ends having angular faces.

8. A magnet and retention clip assembly comprising:
   a magnet holder defining a cavity having an exposure opening in a face of said holder and an assembly opening for receiving a magnet;
   at least one deflectable retention arm at least partly obstructing said assembly opening;
   a probe extending outwardly from said magnet holder;
   first and second stabilizers at opposite sides of said magnet holder, substantially normal to said probe;
   a stepped magnet disposed in said cavity, said magnet having a base and a projection from said base, said projection being narrower than said base leaving an exposed surface of said base outwardly of said projection; and
   said projection being exposed in said exposure opening.

9. The assembly of claim 8, said cavity having a closed end and an open end, said open end comprising said assembly opening; first and second channels on opposite sides of said cavity; and said base of said magnet disposed in said channels.

10. The assembly of claim 8, said cavity forming a flange whereby said assembly opening is larger than said exposure opening.

11. The assembly of claim 10, said cavity being circular.

12. The assembly of claim 10, said cavity being rectangular.

13. The assembly of claim 8, said at least one retention arm being at least two said retention arms on opposite ends of said cavity.

14. The assembly of claim 13, said deflectable arms having distal ends with angular confronting faces.

15. The assembly of claim 8 including first and second probes spaced from one another and having tapered distal ends.

16. A wall panel assembly comprising:
   a panel frame having at least a metal component;
   a panel of fibrous material;
   a magnet retention clip including a magnet holder defining a cavity having an exposure opening, a probe extending from said magnet holder and embedded in said fibrous material, and first and second stabilizers at opposite sides of said magnet holder, substantially normal to said probe, said stabilizers being in contact with said fibrous material;
   a magnet disposed in said cavity and having a portion thereof exposed in said exposure opening; and
   said magnet being assembled to said metal component.

17. The wall panel assembly of claim 16, said probe being embedded through an edge of said panel.

18. The wall panel assembly of claim 16, said magnet retention clip having a flat side along an edge of said panel.

19. The wall panel assembly of claim 18, said magnet assembled in said clip through an assembly opening in said holder, and said holder including at least one deflectable retention arm engaged against said magnet.

* * * * *

UNITED STATES PATENT AND TRADEMARK OFFICE
CERTIFICATE OF CORRECTION

PATENT NO. : 7,631,467 B2  Page 1 of 1
APPLICATION NO. : 11/526371
DATED : December 15, 2009
INVENTOR(S) : Martin Henry David Clarke It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 517 days.

Signed and Sealed this

Second Day of November, 2010

David J. Kappos
*Director of the United States Patent and Trademark Office*